United States Patent [19]

Katagi

[11] 4,334,223

[45] Jun. 8, 1982

[54] MEDIAN DETECTOR

[75] Inventor: Kazuo Katagi, Woodland Hills, Calif.

[73] Assignee: Sperry Corporation, New York, N.Y.

[21] Appl. No.: 160,462

[22] Filed: Jun. 18, 1980

[51] Int. Cl.³ ............................................. G01S 13/95
[52] U.S. Cl. .................................... 343/5 W; 364/734
[58] Field of Search ............... 343/5 W; 364/715, 734

[56] References Cited

U.S. PATENT DOCUMENTS 3,748,449  7/1973  King ..................................... 364/734
4,023,165  5/1977  Holt et al. .......................... 343/5 W

FOREIGN PATENT DOCUMENTS 622094  8/1978  U.S.S.R. .............................. 364/734

Primary Examiner—T. H. Tubbesing
Attorney, Agent, or Firm—Howard P. Terry

[57] ABSTRACT

A median detector receives serially a series of numbers, the median of which is to be determined. The detector includes an ordered plurality of registers and a like plurality of comparators each associated with a different register. The respective comparators are responsive to the respective values of numbers already in the registers and to values of new numbers in the series to rank the numbers in numerical order in the registers. After the ranking, the register associated with the middle number in the series contains the median value.

6 Claims, 4 Drawing Figures

MEDIAN DETECTOR

This invention relates to digital logic circuits and more particularly to digital logic circuits for determining the median of a series of numbers.

The word "median", as used hereinafter, is defined in Webster's Seventh New Collegiate Dictionary published by G & C Miriam Company, Springfield, Mass. as "a value in an ordered set of values below and above which there are an equal number of values." For example, the median of the series of numbers 3, 4, 5, 8, and 10 is five. By comparison, the average of that series of numbers is six. There are applications requiring the determination of the median of a series of numbers. Apparatus exists to approximate the median by determining the average of the numbers which normally gives sufficiently accurate results. However, unusually high or unusually low numbers can distort the result.

One prior art method for determining the median of a series of numbers involves assigning a counter for each value the numbers can attain and then counting in each counter, the number of numbers at or exceeding the associated value. Then the largest value is chosen which corresponds to a count of at least half the numbers of numbers. This method is described in more detail in Skolnik, M. I.: "Introduction to Radar Systems," McGraw-Hill Book, Co., Inc. New York, 1962, sec. 9.9, pp. 446–449. If the value of the numbers can range from one to nine, nine counters and associated logic are needed so that this method becomes rather cumbersome and expensive. It is, of course, possible to compute the median using software techniques, but the computational device may be too slow to satisfy other system constraints or may be too costly if no other computational requirements exist.

In accordance with a preferred embodiment of the invention a median detector for determining the median value of a known number X of samples presented serially comprises a plurality Y of registers in an ordered array each initially cleared to one of a maximum and a minimum value where Y is no less than the integer of $(X+1) \div 2$. A means is responsive to the value of each of the serially presented numbers and to the numbers in the registers for comparing the values presented with the values in the registers and for producing signals indicative of the results of said comparisons. A means responsive to the comparison means is provided for inserting the numbers in the registers in numerical order. The value in the register which corresponds to half the number of numbers presented contains the median value.

Figure 1:
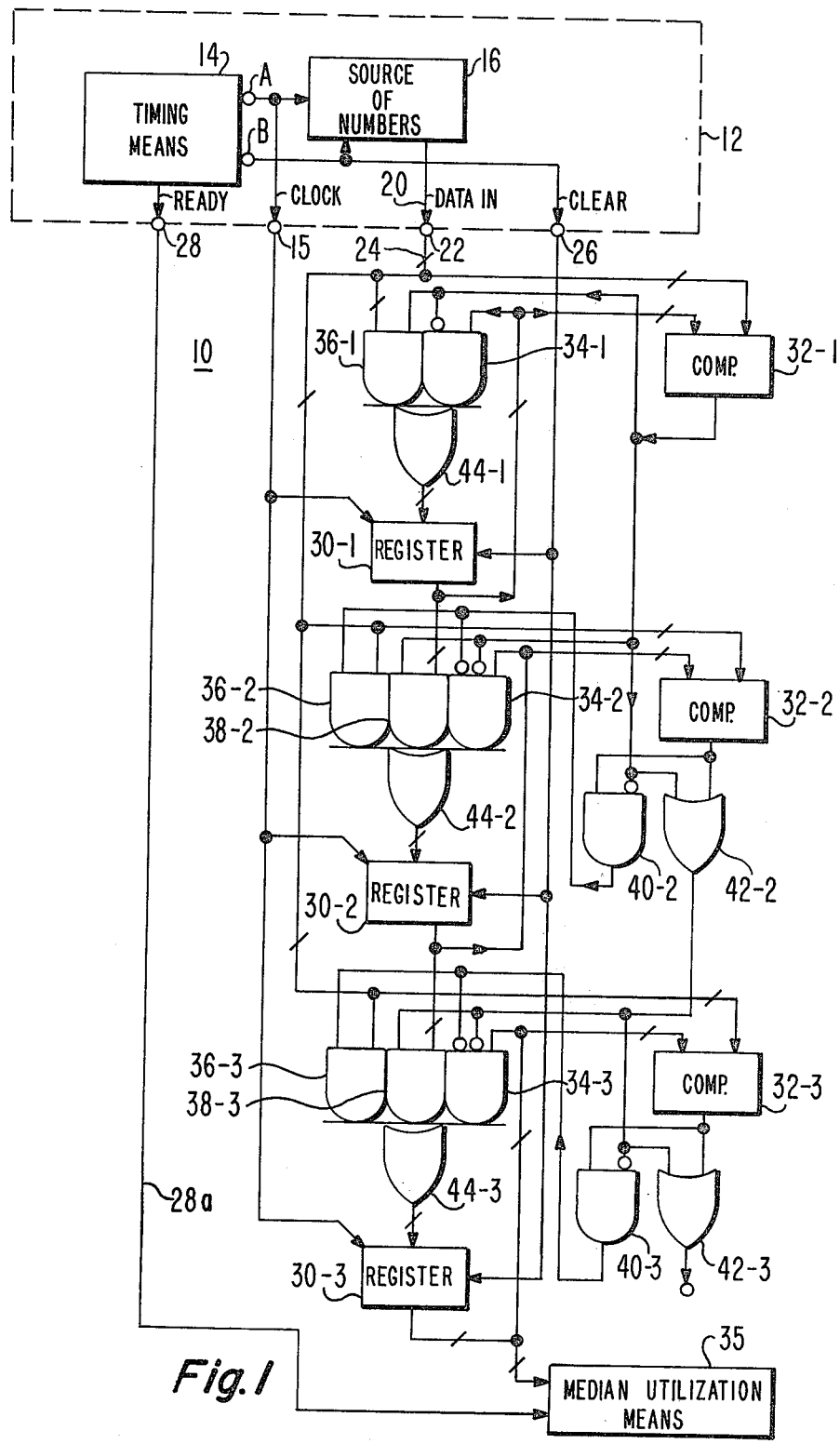
FIG. 1 is a median detector in block diagram form in accordance with a preferred embodiment of the invention.

Referring now to FIG. 1, median detector 10 contains all elements illustrated except those in dashed block 12 which provide control and data signals to the median detector. Timing means 14 is a suitable source providing various timing signals including, at terminal 15, periodic pulses of value which will arbitrarily be termed, a logic one at a rate at which it is desired to operate median detector 10. Timing means 14 terminal A is connected to a source 16 of numbers and to a clock terminal 15. Timing source 14 terminal B is connected to source 16 and to a terminal 26 to provide clear pulses. Source 16 is any suitable source such as a piece of test equipment, a computer, or data gathering equipment providing in series, upon receipt of each succeeding pulse from terminal 15, numbers, the median of which is to be determined.

Source 16 provides numbers in binary form via multiconductor cable 20 at terminal 22. All multiconductor cables will be indicated by a slash mark such as 24. The number of conductors in cable 20 and other multiconductor cables to be noted is determined by the number of values which source 16 may produce. If the numbers can be any of the ten values, cable 20 must have at least 4 conductors. If the number can be any of 8 values, the cable 20 must have at least 3 conductors.

Although not required for the practice of the invention, the detector illustrated in FIG. 1, can detect a median of only a given number of numbers. Therefore timing source 14 determines when that number is reached and provides a ready pulse at terminal 28 followed by a clear pulse at terminal 26 to clear detector 10 and initialize source 16. The clock and clear terminals 15 and 26, respectively, are coupled to the clock and clear inputs of a plurality of registers 30-1, 30-2, and 30-3 respectively.

The number Y of registers is related to the number X of numbers the median of which is to be determined by the relation, $(X+1) \div 2$. If the result is a fraction, the next higher or lower number of registers may be utilized as will be described in more detail hereinafter. Thus, in the illustration in FIG. 1, three registers enable determination of the median of four, five or six numbers. Determination of the median of more than six numbers requires more registers and associated logic. Assuming arbitrarily that each of the numbers produced by source 16 can have no more than 8 values, registers 30 may be three-bit registers. The registers 30 are receptive of data when clock pulses are presented and are cleared to either all logic 0's or logic 1's (as will be described hereinafter) when timing means 14 produces at terminal B a clear pulse.

Elements such as registers 30 will be referred to with the number following the hyphen deleted when reference is made to the entire group of elements. A reference to a single element will incorporate the number following the hyphen (e.g. register 30-2).

The data output of each of registers 30-1, 30-2, and 30-3, is coupled to one input of an associated comparator 32-1, 32-2, and 32-3, respectively. As the median detector of FIG. 1 arranges input data in descending order each of comparators 32 produces a logic 1 if the data at terminal 22 equals or exceeds data in the associated register. Otherwise, the comparator produces a logic 0. The data outputs from registers 30 are coupled to an input of each of respective AND gates 34-1, 34-2, and 34-3. Terminal 22 is coupled via multiconductor cables to each of comparators 32 and to an input of AND gates 36-1, 36-2, and 36-3. The output of comparator 32-1 is coupled to an input of AND gate 36-1, to an inverting input of AND gate 34-1, to an input of AND gate 38-2, to an inverting input of AND gate 34-2, to an inverting input of AND gate 40-2 and to an input of OR gate 42-2. Inverting terminals on various AND gates are indicated as little circles and cause the inversion of one logic level presented thereat to the other logic level. That is, if a logic 0 signal is applied to an inverting terminal, it will be inverted and applied to the associated AND gate as a logic 1 signal. Conversely, a logic 1 signal will be inverted and applied to the AND gate as a logic 0 signal.

The outputs of each of AND gates 34-1 and 36-1 are coupled to respective inputs of an OR gate 44-1 and the output of OR gate 44-1 is coupled to the data input terminal of register 30-1. The data output of register 30-1 is coupled to one input of AND gate 38-2. The output of comparator 32-2 is coupled to a second input of OR gate 42-2 and to a second input of AND gate 40-2. The output of AND gate 40-2 is coupled to an input of AND gate 36-2 and to an inverting input of AND gate 34-2.

The outputs of each of AND gates 34-2, 36-2, and 38-2 are coupled to respective inputs of an OR gate 44-2 which is, in turn, coupled to the data input of register 30-2. The output of register 30-2 is coupled to one input of AND gate 38-3. The output of OR gate 42-2 is coupled to an input of AND gate 38-3, an inverting input of AND gate 34-3, to an inverting input of AND gate 40-3 and to the input of OR gate 42-3. The output of comparator 32-3 is coupled to a second input of OR gate 42-3 and to a second input of AND gate 40-3. The output of AND gate 40-3 is coupled to an input of AND gate 36-3 and to an inverting input of AND gate 34-3. The outputs of the three AND gates 34-3, 36-3, and 38-3, are coupled to an OR gate 44-3 which, in turn, is coupled to the data input of register 30-3.

The output of register 30-3 is coupled to a median utilization means 35 as is terminal 28 via lead 28a. The output of register 30-3 when the ready signal is present, is the median value determined by detector 10 as will be hereinafter described. It should be noted that for a three-stage median detector, OR gate 42-3 is unnecessary. It is utilized in the event that more than three stages are used in the median detector. In this case additional stages would simply be continued on as is the stage that consists of the hyphen 3 components attached to the hyphen 2 components.

Operation of the detector of FIG. 1, will now be described with the assumption that the median of five numbers, 4, 3, 1, 5, 5, is to be determined by ranking the numbers in descending order.

Whether the rank is to be in descending or ascending order is only of significance if an even number of numbers is to be ranked.

Figure 2:
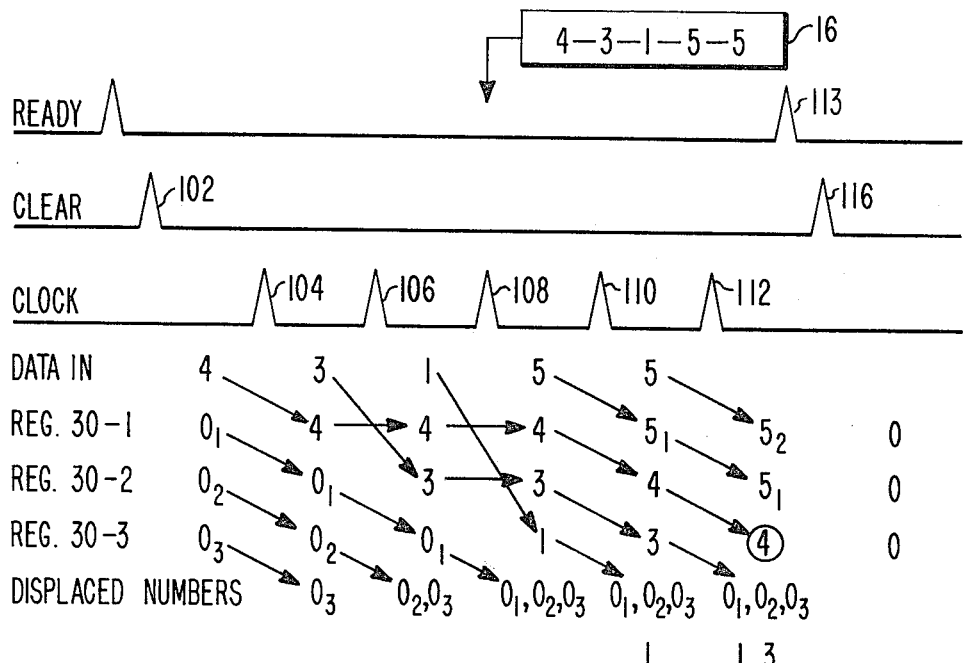
FIGS. 2 and 4 are each a combination timing chart and table of values stored in the registers of FIG. 1 at various points in time.

FIG. 2, which is a combination timing diagram and table, shows the contents of registers 30 at various times. It should be referred to as appropriate to understand the operation of FIG. 1. Initially a clear pulse 102 (FIG. 2) is produced at terminal 26 which clears all registers 30 to a zero value. If the numbers were to be ranked in ascending order, each register would be cleared to a maximum possible number (e.g. three logic 1's). The resulting zeroes from the various registers 30 are applied to respective inputs of the various comparators 32. Further, the first data input number, "4" of an exemplary series of five numbers 4, 3, 1, 5, and 5, as illustrated in FIG. 2, is presented at terminal 22, FIG. 1 and applied to all comparators 32. Since the number "4" is greater than the number "0", all comparators will provide logic 1's. The logic 1 from comparator 32-1 will disable AND gates 34-1 and 34-2, and will enable AND gates 36-1 and 38-2. Concurrently, AND gate 40-2 is also disabled by the inverted logic 1 from comparator 32-1. Gate 40-2 then produces a logic 0 which disables AND gate 36-2 and would enable AND gate 34-2 if it were not disabled by the logic 1 from comparator 32-1. Further, either the logic 1 signal from comparator 32-1 or from comparator 32-2 enables OR gate 42-2 causing it to produce a logic 1 signal. The logic 1 signal from gate 42-2 disables AND gate 40-3 and 34-3 and enables AND gate 38-3. The resulting logic 0 from AND gate 40-3 disables AND gate 36-3. Thus, prior to the production of the next clock pulse (104, FIG. 2), gates 36-1, 38-2, and 38-3, are enabled. All other AND gates in FIG. 1 are disabled.

Clock pulse 104 causes all registers 30 to accept data. Thus, referring to FIG. 2, the number "4" at terminal 22 is transferred to register 30-1; the "0" in register 30-1 (designated in FIG. 2 by a subscript 1 to differentiate it from other 0's) is transferred to register 30-2; the "0" in register 30-2 is transferred to register 30-3; the "0" in register 30-3 is displaced. Pulse 104 also moves the next number "3" to the terminal 22, but not in time to be transferred through gate 36-1 into register 30-1. In summary, the number "4" being of higher value than all the "0's" is positioned in the highest order register 30 while the 0's are transferred to lower order registers 30-2 and 30-3, respectively. The number "3" at terminal 22, resulting from pulse 104, being lower in value than the number "4" and being greater in value than the number "0" will cause comparator 32-1 to produce a logic 0 and will cause comparators 32-2 and 32-3 to produce logic 1 signals. Therefore, AND gates 34-1, 36-2, and 38-3 are enabled. All other AND gates are disabled. Therefore, upon production of the next clock pulse, (pulse 106, FIG. 2), the number "4" from register 30-1 is rewritten via gate 34-1 back into register 30-1; the number "3" from source 16 is written via gate 36-2 to register 30-2; the number "0" from register 30-2 is transferred via gate 38-3 to register 30-3; the number "0" in register 30-3 is displaced.

Pulse 106 causes the number "1" to be presented at terminal 22. In the manner above described upon production of a next clock pulse 108 (FIG. 2) the number "4" is rewritten in register 30-1 via AND gate 34-1; the number 3 is rewritten into register 30-2 via gate 34-2; the number 1 is written into register 30-3 displacing a 0 previously in the register.

After two more clock pulses, 110, 112, in FIG. 2, the numbers are ranked in descending order with the number in register 30-3 being the median value. The ready pulse 113 transfers the median value in register 30-3 to median utilization means 35. The subsequent clear pulse 116 clears all registers 30 to zero values for the next sequence.

Figure 4:
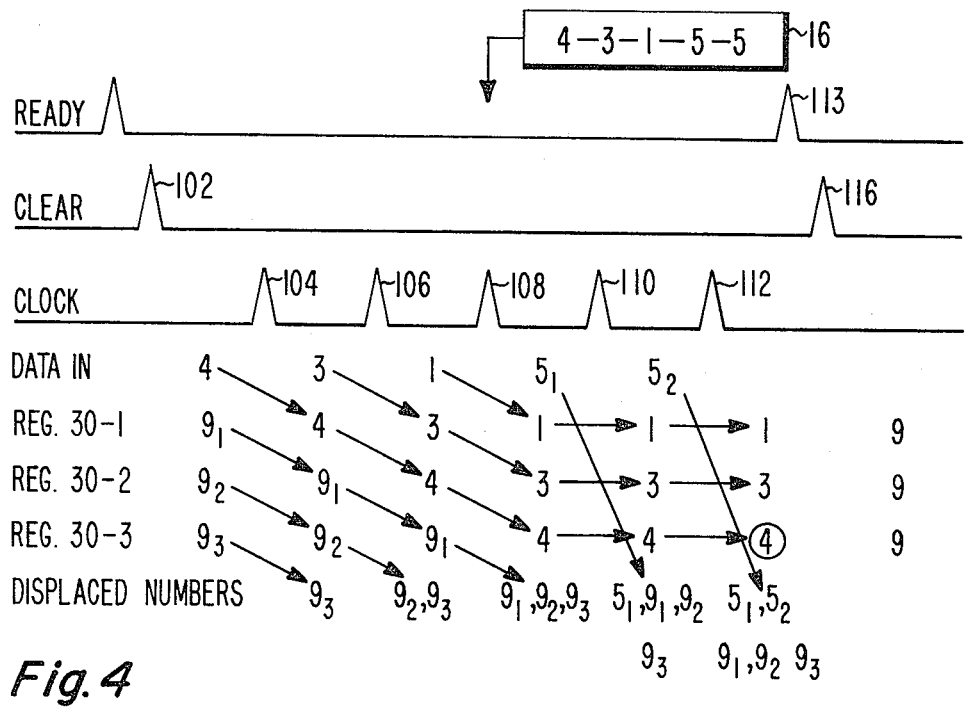

It will be realized from the foregoing, that ascending order ranking can as easily be accomplished by presetting all registers 30 to a maximum count and by utilizing comparators 32 which produce logic 1's when the new data presented thereto is less than or equal to the value of the associated register. FIG. 4 is similar to FIG. 2 but illustrating numbers being ranked in descending order in registers initially cleared to the number "9".

Any number of numbers can be ranked using the detector of FIG. 1 by merely adding more registers 30, comparators 32 and associated gates. The number of numbers the median of which is to be determined need not be known in advance. Only the maximum number of numbers need be known so a sufficient number of registers can be provided. If the number of the numbers is variable an indicator can be placed between each series of numbers in source 16. The number of numbers in each series can be counted and upon reception of an indicator from source 16, the number of numbers is known. Using the count obtained, the register corresponding to the median of that number of numbers counted can be read out to median utilization means 35.

Figure 3:
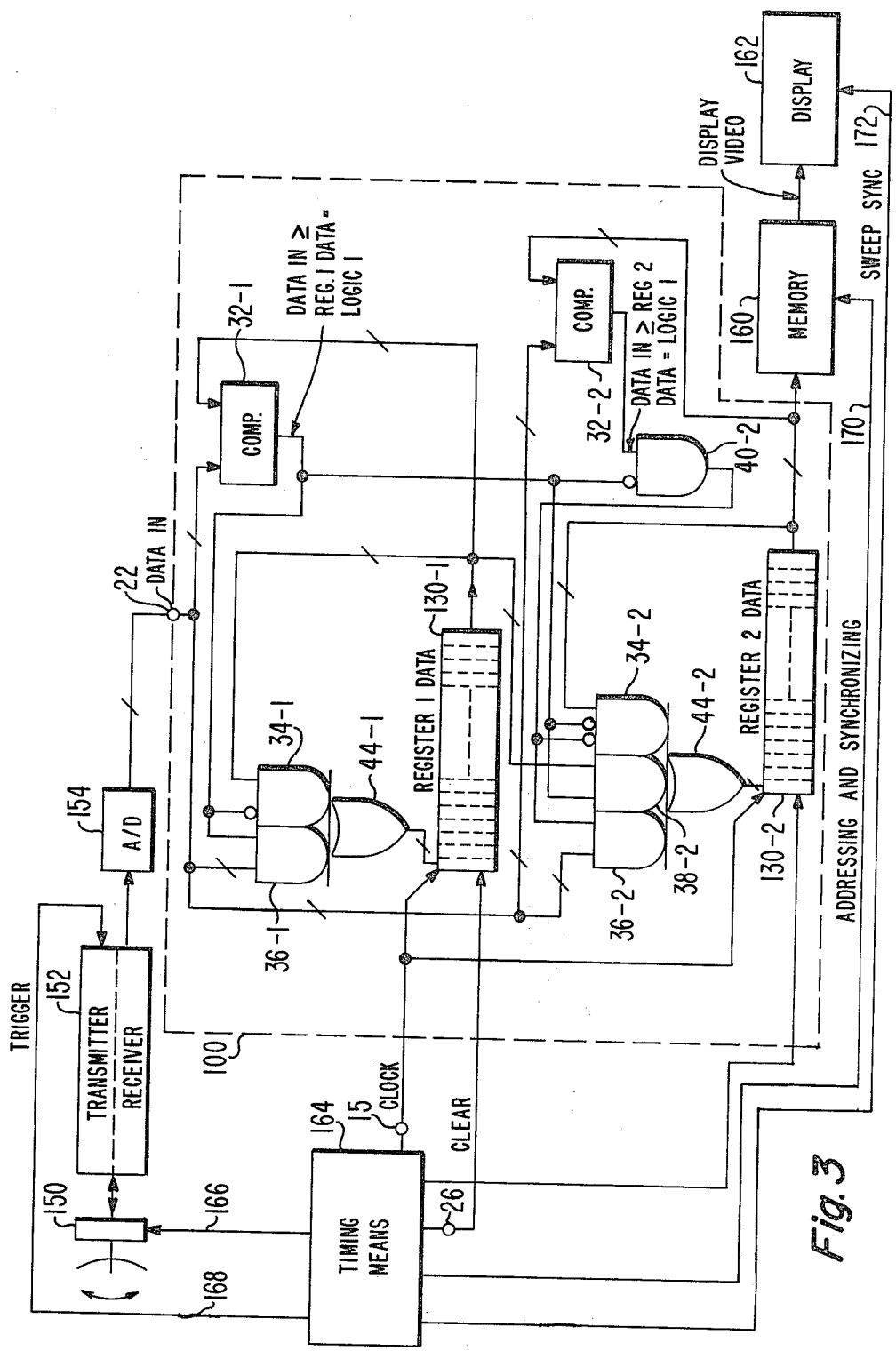
FIG. 3 is a weather radar system incorporating the median detector of FIG. 1.

One system which can use the median detector of FIG. 1, is the digital airborne weather radar system illustrated in FIG. 3 to which attention is now directed. Elements which are comparable in the two figures (FIGS. 1 and 3) bear identical identification numbers. In FIG. 3, the median detector is located within dashed block 100. In FIG. 3, register numbers 130-1 and 130-2 (also known as registers 1 and 2 respectively and collectively as registers 130) are shift registers and each typically hold 256 three-bit digits. This is contrasted with the single digit registers 30 illustrated in FIG. 1.

In addition to median detector 100 the airborne weather radar system of FIG. 3 includes other apparatus which is conventionally found in digital airborne weather radar systems of the type commercially available. One such exemplary system is the model PRIMUS series airborne weather radar systems manufactured and sold by Sperry Corporation, 8500 Balboa Blvd. Van Nuys, Calif. In particular, a pivotable receiving and transmitting antenna 150 is coupled to a receiver-transmitter unit (R/T) 152. R/T 152 is coupled to an analog-to-digital converter (A/D) 154 which produces in response to signals received from R/T 152 a stream of three-bit digital data signals as will be hereinafter described. A/D 154 is coupled to terminal 22. Data presented at terminal 22 is coupled to register 130 via gates 36, (36-1 and 36-2 in FIG. 3). Each of the registers 130 may consist of a 256 stage three-bit wide shift register.

The output of register 130-2 is coupled to memory 160 which may be functionally arranged as 256 rows each of 256 three-bit digits. Memory 160 is coupled to a suitable raster scan type color CRT display 162.

A timing means 164 contains those components contained in block 12 in FIG. 1 and contains other timing signals which are typically driven by a master clock (not shown). Timing means 164 transmits pulses on line 166 to pivot antenna 150 to successive azimuth positions. Typically, each pulse causes antenna 150 to pivot a fraction of one degree and the antenna may pivot over a total sector of 50° to 90° to either side of a center axis. Each time the antenna is positioned to the next azimuth position, a pulse is transmitted on line 168 to the transmitter portion of R/T 152 which in turn causes a radar pulse to be emitted from antenna 150 into the atmosphere. The pulse strikes and is reflected back from any precipitation contained in the atmosphere in the path of the pulse. Signals transmitted on line 170 from timing means 164 provide addressing information to memory 160 to store at selected locations therein information which is received from register 130-2 and to read information from memory 160 to be displayed on display 162. Signals on line 172 to display 162 cause information from memory 160 to be displayed in a desired format to display precipitation as a function of azimuth and range relative to antenna 150.

The generalized operation of the weather radar system of FIG. 3 will now be given followed by a more detailed explanation. First antenna 150 is positioned to a desired azimuth position. A radar pulse is transmitted thereby and return echo signals to the antenna are converted into analog signals from receiver 152 representative of precipitation levels at succeeding range points in front of antenna 150. This analog signal as a function of time is converted by analog A/D 154 into a succession of digital signals representative of precipitation level. It is common practice in the weather radar industry to combine signals at each of a succession of 256 ranges at four successive azimuth positions of 150 into one composite block of 256 data digits which is then stored in memory 160. The purpose of median detector 100 in FIG. 3 is to determine the median of the four signals produced at four successive azimuth positions as a function of range in order to eliminate unwanted signals such as IF amplifier noise, other radar interference etc. Registers 130 also buffer the radar data between data acquisition and incoming updating.

Detailed operation of the system of FIG. 3 is as follows. Initially, it will be assumed that registers 130-1 and 130-2 are cleared to all 0's by a clear pulse produced at terminal 26. Further antenna 150 is positioned to a desired azimuth position. Then on line 168, a pulse is produced by timing means 164 which causes a radar pulse to be emitted by antenna 150 into the atmosphere. As the return echo signal is received at antenna 150 from successive range points, it is converted on a continuous basis into digital signals of eight levels or less (three bit) by A/D 154. As each clock pulse occurs at terminal 15, the value of data at A/D 154 is provided to median detector 100 at terminal 22. Assume, for example, that it is desired to determine precipitation for a distance 256 miles in front of antenna 150. Timing means 164 produces, at terminal 15, 256 successive periodic clock pulses during the time which information is received from 256 miles in front of antenna 150 and digitized by A/D 154. In the manner described in connection with FIG. 1, as the data is made available at terminal 22, it is compared by comparators 32-1 and 32-2 with information contained in respective registers 130-1 and 130-2. The data compared in comparators 32 from registers 130 is that at the last stage of shift registers 130 which will, in the case described be all 0's. Upon receipt of the first clock pulse at terminal 15 following the transmission of a radar pulse from antenna 150, the data in register 130-1 will be at least "0" if not a greater number. Therefore, comparators 32-1 and 32-2 will each produce a logic 1 and the data at terminal 22 will be written via AND gate 36-1 into the first stage of the shift register 130-1 while the "0" in the right most portion of register 130-1 will be written via gate 38-2 into the first or left position of register 130-2. Thus, after 256 clock pulses have been produced at terminal 15, register 130-1 will contain digital information corresponding to the precipitation at 256 one mile range increments in front of antenna 150.

Next, the antenna is caused to pivot to the next desired azimuth position by a pulse on line 166 during which time no clock pulses are produced by timing means 164. Thereafter a radar pulse is caused to be transmitted from antenna 150. The resulting echo return information is made available at terminal 22 as described in connection with the preceding azimuth position. At this point in time, register 130-1 presumably contains data which includes values other than 0 while register 130-2 still includes all 0 values having been transferred at the preceding azimuth position from register 130-1. As described in connection with the FIG. 1 median detector, the new information appearing at terminal 22 is placed in either register 130-1 or register 130-2 depending on whether the new information is higher, the same or lower in value than the information contained in the register 130-1.

In succession, antenna 150 is positioned to two more different azimuth positions by signals on line 166 and median detector 100 incorporates the resulting 512 digital values with those values already existing in registers 130-1 and 130-2.

It will be remembered from the description given of FIG. 1, that the number Y of registers required relative to the number X of samples, the median of which is to be determined, is determined by the formula $(X+1) \div 2$. Where that number is a fraction, the number is incremented or decremented by a half. In this case, X is 4 and Y would be $2\frac{1}{2}$. Since it is arbitrary whether one more or one less value is used for the median and considerable savings can be affected by not incorporating additional stages of registers and comparators, only two registers are used. Thus, after signals have been returned at four successive azimuths, register 130-2 contains 256 numbers which correspond to the median levels of signals received at four different azimuth positions over a 256 mile space in front of antenna 150. The timing of successive trigger pulses on line 168 is such that there is ample time to transfer the data from register 130-2 to memory 160 prior to a transmitted pulse at the next or fifth successive azimuth position. Thus, additional clock pulses are produced at terminal 15 to cause the data in register 130-2 to be stored at desired locations in memory 160. Thereafter a clear pulse causes both registers 130-1 and 130-2 to be cleared to all zeros as previously described. Thereafter, the procedure repeats for successive groups of data received at successive groups of four azimuth positions.

What is claimed is:

1. Apparatus for determining the median value of a known number X of data numbers presented seriatim at said apparatus, comprising in combination:
   a plurality Y of registers in an ordered array, all said registers being initially cleared to one of a maximum or minimum value, where Y is no less than the integer of $(X+1) \div 2$;
   means responsive to the value of each of said numbers presented seriatim and to the values of said numbers in said registers for comparing the value of each of said numbers presented seriatim with the value of said numbers in each of said registers and producing a signal indicative of the results of said comparisons; and
   means responsive to said comparison means and to the presence of each of said numbers presented serially for placing the Y most significant or least significant ones of said numbers presented serially in numerical order in said registers, whereby when all said X numbers have been presented to said apparatus the register corresponding to half the numbers presented contains said median value.

2. The combination as set forth in claim 1, wherein said means for comparing comprises a comparator means associated with each of said Y registers, each for comparing the value of the number of said associated register with the values of presented numbers as they are received and for producing a signal as each number is presented indicative of whether the data number or register number is greater and wherein said means for placing is responsive to said signal from said comparing means.

3. The combination as set forth in claim 2 wherein said comparing means comprises means for producing a signal of a first value when said data number is greater than or equal to said number in said associated register and for further producing a signal having a second value when said number in said associated register is less than said data number.

4. The combination as set forth in claim 3 wherein said means responsive to said comparison means further comprises means for placing said data numbers in said registers in descending order.

5. The combination as set forth in claim 1, wherein said means responsive to said comparing means comprises gating means responsive to said signal from said comparing means.

6. In a weather radar system receptive serially of digital signals of values representing weather conditions at Z succeeding ranges from the system at a given azimuth position and then in order at successive azimuth positions at the same ranges, apparatus for determining the median of digital signals at each of said Z ranges for a given number X of azimuth positions comprising in combination:
   a plurality Y of registers in an ordered array, where Y is not less than the whole number portion of $(X+1) \div 2$ each having Z storage locations, all positions in all registers being initially cleared to one of a maximum or minimum value, each register being responsive to a control signal for moving data contained therein from one storage location to another;
   means responsive to the value of each of said serially presented digital signals and to the value of numbers in a preselected position of each of said registers for comparing the value of each of said serially presented numbers with the values of said numbers in said preselected position in said registers and providing a signal indicative of the results of said comparisons;
   means responsive to said comparing means for placing said serially presented numbers in numerical order in a second different storage location in said registers; and
   means producing said control signal for moving said numbers in said register storage locations from one location to another in correspondence with said values presented serially, whereby when Y.Z serially presented numbers have been received a preselected register will contain Z numbers representing the median values of Y azimuth positions at Z ranges.

* * * * *